US007560140B2

(12) United States Patent
Chen et al.

(10) Patent No.: US 7,560,140 B2
(45) Date of Patent: Jul. 14, 2009

(54) PNEUMATICALLY ADJUSTABLE APPARATUS FOR COATING TONER FUSING BELT SUBSTRATE AND METHOD FOR USING SAME

(75) Inventors: Jiann-Hsing Chen, Fairport, NY (US); Robert A. Lancaster, Hilton, NY (US); Nataly Boulatnikov, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/244,882

(22) Filed: Oct. 3, 2008

(65) Prior Publication Data

US 2009/0035470 A1 Feb. 5, 2009

Related U.S. Application Data

(62) Division of application No. 11/022,419, filed on Dec. 21, 2004, now Pat. No. 7,459,027.

(60) Provisional application No. 60/532,710, filed on Dec. 24, 2003.

(51) Int. Cl.

| | |
|---|---|
| ***B05C 19/02*** | (2006.01) |
| ***B05C 13/02*** | (2006.01) |
| ***B23Q 3/14*** | (2006.01) |
| ***B23Q 3/08*** | (2006.01) |
| ***B65H 75/24*** | (2006.01) |
| ***B05D 5/00*** | (2006.01) |

(52) U.S. Cl. ....................... 427/282; 427/256; 118/423; 118/500; 118/503; 242/571.1; 242/571.2; 269/22; 269/48.1

(58) Field of Classification Search ................. 118/500, 118/503, 423; 269/48.1, 22; 242/571.1, 242/571.2; 427/282, 256
See application file for complete search history.

(56) References Cited

U.S. PATENT DOCUMENTS

| | | | | |
|---|---|---|---|---|
| 3,695,757 | A * | 10/1972 | Gregory | 399/159 |
| 4,680,246 | A * | 7/1987 | Aoki et al. | 430/133 |
| 5,411,779 | A | 5/1995 | Nakajima et al. | |
| 5,433,913 | A | 7/1995 | Kawauchi et al. | |
| 5,753,312 | A * | 5/1998 | Chambers et al. | 427/430.1 |
| 6,500,375 | B1 | 12/2002 | Aulick et al. | |

* cited by examiner

*Primary Examiner*—Timothy H Meeks
*Assistant Examiner*—Mandy C. Louie
(74) *Attorney, Agent, or Firm*—William R. Zimmerli

(57) ABSTRACT

An apparatus for enabling the uniform application of a layer of a coating composition to a tubular substrate includes a shaft, and upper and lower circular rim members of equal diameter that are concentrically attached to the shaft. A pneumatically inflatable tube disposed on each circular rim member has an outer diameter that is variable with changes in its internal pressure. A first flexible cylindrical sheet in contact with the inflatable tubes has parallel edges that form a first slit sufficiently wide to permit movement of the first sheet in response to pressure variation in the tubes. A second flexible cylindrical sheet surrounding the first cylindrical sheet has parallel edges that form a second slit sufficiently wide to permit movement of the second sheet also in response to pressure variation. The second slit is laterally displaced from the first slit, and the second cylindrical sheet has a diameter nearly equal to the specified diameter of the substrate. Each of the tubes is inflatable to a pressure sufficient to provide the substrate with a smooth cylindrical outer surface for uniform application of a coating.

5 Claims, 1 Drawing Sheet

PNEUMATICALLY ADJUSTABLE APPARATUS FOR COATING TONER FUSING BELT SUBSTRATE AND METHOD FOR USING SAME

CROSS REFERENCE TO RELATED APPLICATIONS

This is a divisional application of application Ser. No. 11/022,419 filed Dec. 21, 2004, now U.S. Pat. No. 7,459,027 which claims benefit of U.S. Provisional Application Ser. No. 60/532,710, filed Dec. 24, 2003.

FIELD OF THE INVENTION

The present invention relates to toner image fuser belts and, more particularly, to an apparatus and a method for uniformly coating a toner fusing belt substrate.

BACKGROUND OF THE INVENTION

The fusing of thermoplastic dry toner powders to receiver sheets of paper or plastic to form electrostatographic images or copies is well known in electrophotographic and dielectric recording processes. Either black and white or multicolor images can be formed, by fusing such thermoplastic toners to receiver sheets. Two types of fuser systems are commonly used for applying heat and pressure to fuse and fix the toner particles to the receiver: fuser roller systems and fuser belt systems. One problem with fuser roller systems is related to the high release temperature of the rollers, that is, the temperature at which the receiver sheet leaves the nip of the rollers. Under such conditions, the toner can act as a hot melt adhesive, causing the receiver sheet to adhere to the roller.

Fuser belt systems can reduce some of the problems encountered with fuser rollers. For example, U.S. Pat. No. 5,089,363, discloses that metal belts coated with highly cross-linked polysiloxanes produce toner images having high gloss. Such polymeric release coatings, however, have poor adhesion to the usual belt substrate materials.

Polyimide belts are highly flexible and can be more easily handled without forming kinks than metal belts. Polyimides useful as fusing belts are disclosed in U.S. Pat. No. 5,411,779, the disclosure of which is incorporated herein by reference. As disclosed in the reference, the polyimide can be prepared in tubular or belt form by coating a poly(amic acid) solution on the inner circumference of a cylinder and imidizing the poly(amic acid) to form a tubular inner layer of the polyimide resin. Following heating-drying, the polyimide belt is removed from the cylinder.

An important advantage of a polyimide as a fuser belt substrate is related to its fabrication as a seamless belt, which avoids the problem of seams that are visible in the toner image. The fact that a polyimide belt cools more rapidly than a metal belt after it leaves the heated nip of the fuser system represents another advantage of a polyimide fuser belt substrate.

Polyimides are useful materials for the fabrication of fuser belts, but they are difficult to process. U.S. Pat. No. 6,500,375, the disclosure of which is incorporated herein by reference, describes a process for forming a seamless polyimide tube using a canted doctor blade to shape a coating of a resin precursor solution on a mandrel prior to curing. As discussed in the reference, polyimides are thermosetting resins that cannot be reformed with heat and are soluble in only a limited number of relatively high-boiling solvents. Curing conditions, which entail high temperatures, are difficult to optimize and greatly affect the mechanical properties of the cured film. Finally, the cost of polyamic acid resins is high, so minimizing waste of both the starting materials and product resins is very desirable.

U.S. Pat. No. 5,433,913, the disclosure of which is incorporated herein by reference, describes a process for manufacturing a resinous tube from a heat-resistant resin such as a polyimide resin by coating a highly viscous resin precursor solution on a core and dropping a metallic die around the coating to form a tube of the resin precursor, which is cured and remove from the core.

A toner release layer can be applied to a pre-formed polyimide belt substrate by spray, dip, or ring coating. A spray-coated layer is generally not satisfactory because its uneven thickness and non-uniform surface leads to degradation of the gloss and overall quality of a fused toner image. Although dip or ring coating might be expected to provide improved coating uniformity, these methods require that the tubular substrate be firmly maintained in a cylindrical shape during coating. However, given the inevitable dimensional variability arising in the manufacture of the seamless polyimide belt substrates, it can be can difficult to achieve the required coating conditions conveniently and reliably. The apparatus of the present invention provides an effective solution to such coating problems.

SUMMARY OF THE INVENTION

The present invention is directed to an apparatus for enabling the uniform application of a layer of a coating composition to a substrate that is a seamless tubular flexible cylinder having a specified length and a specified diameter. The apparatus includes a shaft, and upper and lower circular rim members of equal diameter, each concentrically attached to the shaft and separated from one another by a distance at least equal to the length of the substrate. A pneumatically inflatable tube is disposed on each circular rim member, the outer diameter of each tube being variable with changes in its internal pressure.

A first flexible cylindrical sheet that contacts and substantially surrounds each of the inflatable tubes has parallel edges that form a first slit sufficiently wide to permit movement of the first sheet in response to variation in the internal pressure of the tubes. A second flexible cylindrical sheet that contacts and substantially surrounds the first cylindrical sheet has parallel edges that form a second slit sufficiently wide to permit movement of the second sheet in response to variation in the internal pressure of the tubes. The second slit is laterally displaced from the first slit, and the second cylindrical sheet has a diameter nearly equal to the specified diameter of the substrate. In the operation of the apparatus, each of the tubes is inflatable to a pressure sufficient to provide the substrate with a smooth cylindrical outer surface for uniform application of a coating composition.

DETAILED DESCRIPTION OF THE INVENTION

The pneumatically adjustable coating apparatus of the present invention is particularly suitable for applying a uniform coating of a release layer to a seamless polyimide substrate of a toner fuser belt. Use of the resulting toner fuser member in an electrostatographic apparatus provides high gloss print toned images of excellent quality.

The coating apparatus of the invention, which holds the seamless polyimide belt in a cylindrical shape with sufficient tension to remove any folds or lines, facilitates the uniform application of the release layer to the belt, preferably by ring coating. The pressure of the inflatable tubes can be adjusted to compensate for diameter variations that fall within the tolerances for commercially produced polyimide belts.

Coating mandrels of the prior art have been heavy and expensive machines and did not readily maintain the substrate in the smooth cylindrical shape required for uniform coating, even while providing a very limited range of diameter adjustments. The apparatus of the present invention, by contrast, is light in weight and economically constructed. Furthermore, because of the even, easily adjustable expansion of the pneumatic tubes around the entire circumference of the rim members, the cylindrical shape of a tubular substrate can be maintained over a greater range of diameters.

Figure 1:
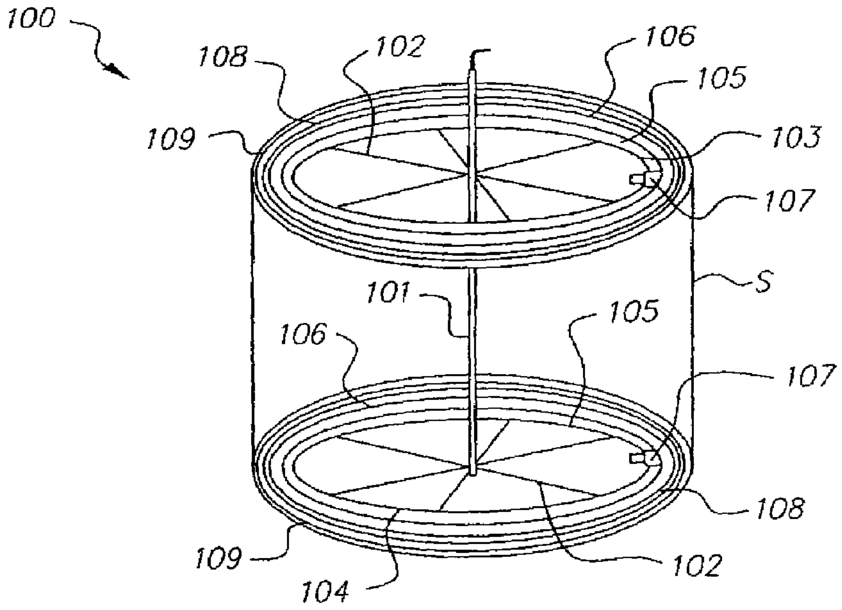
FIG. 1 is a perspective drawing of the apparatus of the present invention.
Figure 2:
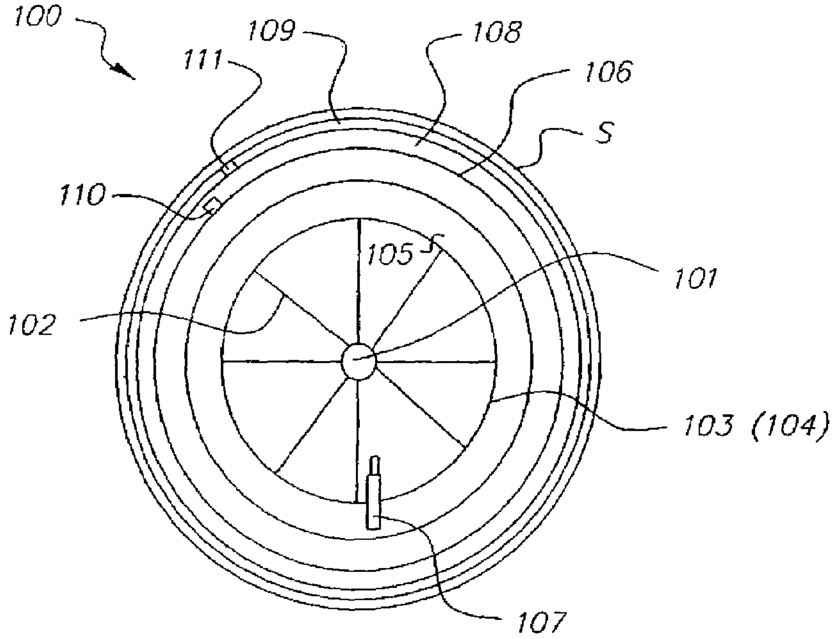
FIG. 2 is a top plan view of the apparatus.

As shown in FIGS. 1 and 2, a coating apparatus 100 includes a shaft 101, to which is attached, by spokes 102, an upper rim member 103, and a lower rim member 104. Rim members 103 and 104 each include a slot 105, into which pneumatic tubes 106, each provided with a pneumatic valve 107, are mounted. In one embodiment, rim members 103 and 104 together with slots 105, tubes 106, and valves 107 resemble bicycle tires with the shaft 101 being substantially vertical and the rim members 103 and 104 being concentrically attached substantially horizontally to the shaft 101 and separated from one another by a distance at least equal to the length of seamless tubular flexible substrate S.

A first flexible cylindrical sheet 108 contacts and substantially surrounds tubes 106, and a second flexible cylindrical sheet 109 contacts and substantially surrounds sheet 108. Sheets 108 and 109 preferably are formed from stainless steel, and sheet 108 is preferably thicker than sheet 109. Convenient thicknesses of the stainless steel employed for sheets 108 and 109 are, respectively, 36 mils and 23 mils. The edges of sheets 108 and 109 form, respectively slits 110 and 111, which are laterally displaced from one another.

In the operation of apparatus 100, a seamless tabular flexible substrate S is paced over second flexible cylindrical sheet 109. Using valves 107, the pressure in tubes 106 is adjusted, causing sheets 108 and 109 to flex and thereby provide sufficient tension so that belt substrate S, which preferably is formed from polyimide, is maintained in a cylindrical shape with a smooth surface that is free of any folds or lines. This allows a layer of a coating composition, preferably for a toner release layer, to be uniformly applied, preferably by dip coating, to the surface of substrate S.

Following drying of the coated layer on belt substrate S, the pressure in tubes 106 is decreased by the release of air through valves 107, which facilitates the removal of the coated substrate S together with the second flexible sheet 109 from apparatus 100. Sheet 109, which provides support for the coated substrate during curing and post-curing, can be removed following the completion of these processes.

The invention has been described in detail with particular reference to certain preferred embodiments thereof, but it is understood that variations and modifications can be effected within the spirit and scope of the invention, which is defined by the claims that follow.

What is claimed is:

1. With an apparatus comprising a vertical shaft; an upper horizontal circular rim member and a lower horizontal circular rim member of equal diameter, each said rim member being concentrically attached to said shaft and separated from one another by a distance at least equal to the length of the substrate; a pneumatically inflatable tube disposed on each said circular rim member, each said tube being provided with a pneumatic valve and having an outer diameter that is variable with changes in its internal pressure; a first flexible cylindrical sheet contacting and substantially surrounding each of said tubes, said first sheet having vertical edges parallel to one another and forming a first slit sufficiently wide to permit movement of said first sheet in response to variation in said internal pressure of said tubes; a second flexible cylindrical sheet contacting and substantially surrounding said first cylindrical sheet, said second sheet having vertical edges parallel to one another and forming a second slit sufficiently wide to permit movement of said second sheet in response to variation in said internal pressure of said tubes, said second slit being laterally displaced from said first slit, second cylindrical sheet having a diameter nearly equal to the specified diameter of the substrate; a process for coating a seamless tubular flexible cylindrical substrate having a specified length and a specified diameter, said process comprising:

placing said seamless tubular flexible cylindrical substrate around said second flexible cylindrical sheet;

inflating said tubes to a pressure sufficient to provide the substrate with a smooth, uniform cylindrical outer surface; and applying a coating composition to said outer surface of said substrate, thereby forming a uniform layer of said coating composition thereon.

2. The process of claim 1 further comprising:

drying said layer of said coating composition, thereby forming a dried layer on said substrate;

deflating said tubes to a pressure sufficiently low to enable removal of said dried layer, said substrate, and said second flexible cylindrical sheet from said apparatus; and removing said dried layer, said substrate, and said second flexible cylindrical sheet from said apparatus.

3. The process of claim 1 wherein said substrate comprises polyimide.

4. The process of claim 1 wherein said applying said coating composition comprises ring coating said substrate.

5. The process of claim 2 wherein said dried layer comprises a toner release layer.

* * * * *